US012571892B2

(12) United States Patent
Hirano

(10) Patent No.: US 12,571,892 B2
(45) Date of Patent: Mar. 10, 2026

(54) DISTANCE MEASUREMENT DEVICE AND DISTANCE MEASUREMENT METHOD

(71) Applicant: SONY SEMICONDUCTOR SOLUTIONS CORPORATION, Kanagawa (JP)

(72) Inventor: Hiroyuki Hirano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1094 days.

(21) Appl. No.: 17/617,139

(22) PCT Filed: Jun. 11, 2020

(86) PCT No.: PCT/JP2020/023036
§ 371 (c)(1),
(2) Date: Dec. 7, 2021

(87) PCT Pub. No.: WO2020/255855
PCT Pub. Date: Dec. 24, 2020

(65) Prior Publication Data
US 2022/0260691 A1 Aug. 18, 2022

(30) Foreign Application Priority Data

Jun. 20, 2019 (JP) ................................ 2019-114472

(51) Int. Cl.
*G01S 7/495* (2006.01)
*G01S 7/484* (2006.01)
(Continued)

(52) U.S. Cl.
CPC .............. *G01S 7/495* (2013.01); *G01S 7/484* (2013.01); *G01S 7/4865* (2013.01); (Continued)

(58) Field of Classification Search
CPC ........ G01S 7/495; G01S 7/484; G01S 7/4865; G01S 7/487; G01S 17/10
(Continued)

(56) References Cited

U.S. PATENT DOCUMENTS

| 2011/0246116 A1 | 10/2011 | Kamitani et al. |
| 2016/0356896 A1 | 12/2016 | Masunaga et al. |

(Continued)

FOREIGN PATENT DOCUMENTS

| CN | 1503914 A | 6/2004 |
| CN | 101213474 A | 7/2008 |

(Continued)

OTHER PUBLICATIONS

Xiong Xianming et al., "Design of driving laser diode for ladar ranging system", Infrared and Laser Engineering, Feb. 2016, pp. 0206004-1 to 0206004-5, vol. 45, No. 2.

(Continued)

*Primary Examiner* — Robert W Hodge
*Assistant Examiner* — Kara Richter
(74) *Attorney, Agent, or Firm* — CHIP LAW GROUP

(57) ABSTRACT

Provided is a distance measurement device that includes a time measurement unit, a histogram generation unit, a light source control unit, a selection unit, and a distance calculation unit. The time measurement unit measures time information indicating a time from a light emission timing at which a light source emits light to a light reception timing at which a light receiving element receives light. The histogram generation unit generates a histogram based on the time information. The light source control unit dynamically changes a driving state of the light source. The selection unit selects one peak based on the driving state of the light source in a case where a plurality of peaks are detected in the histogram in one frame. The distance calcu- (Continued)

lation unit calculates a distance (D) to an object based on the selected peak.

4 Claims, 9 Drawing Sheets

(51) Int. Cl.
| | |
|---|---|
| *G01S 7/4865* | (2020.01) |
| *G01S 7/487* | (2006.01) |
| *G01S 17/10* | (2020.01) |

(52) U.S. Cl.
CPC ............ *G01S 7/4866* (2013.01); *G01S 7/487* (2013.01); *G01S 17/10* (2013.01)

(58) Field of Classification Search
USPC .......................................................... 356/5
See application file for complete search history.

(56) References Cited

U.S. PATENT DOCUMENTS

| | | | |
|---|---|---|---|
| 2017/0207073 A1* | 7/2017 | Wildgoose | .............. H01J 49/02 |
| 2017/0262768 A1 | 9/2017 | Nowozin | |
| 2018/0259645 A1 | 9/2018 | Shu | |
| 2021/0018624 A1* | 1/2021 | Tachino | .................. G01S 17/10 |
| 2021/0025980 A1 | 1/2021 | Ohki | |
| 2021/0156976 A1* | 5/2021 | Beer | ...................... G01S 17/10 |
| 2021/0373156 A1* | 12/2021 | Kimura | .................. G01S 7/4863 |
| 2021/0396876 A1* | 12/2021 | Nagai | ...................... G01S 17/42 |
| 2022/0035011 A1* | 2/2022 | Pacala | ................... G01S 7/4815 |

FOREIGN PATENT DOCUMENTS

| | | |
|---|---|---|
| CN | 106253853 A | 12/2016 |
| CN | 109239694 A | 1/2019 |
| CN | 109844563 A | 6/2019 |
| EP | 1884797 A1 | 2/2008 |
| EP | 2372389 A1 | 10/2011 |
| EP | 2637038 A1 | 9/2013 |
| JP | 2005-214781 A | 8/2005 |
| JP | 2007-324812 A | 12/2007 |
| JP | 2011-191142 A | 9/2011 |
| JP | 2011-215005 A | 10/2011 |
| JP | 2016176750 A | 10/2016 |
| JP | 2016-224009 A | 12/2016 |
| JP | 2017-125682 A | 7/2017 |
| JP | 2018-091760 A | 6/2018 |
| JP | 2018-194297 A | 12/2018 |
| JP | 2019-078602 A | 5/2019 |
| JP | 2019074375 A | 5/2019 |

OTHER PUBLICATIONS

International Search Report and Written Opinion of PCT Application No. PCT/JP2020/023036, issued on Sep. 8, 2020, 11 pages of ISRWO.

* cited by examiner

Figure 3:
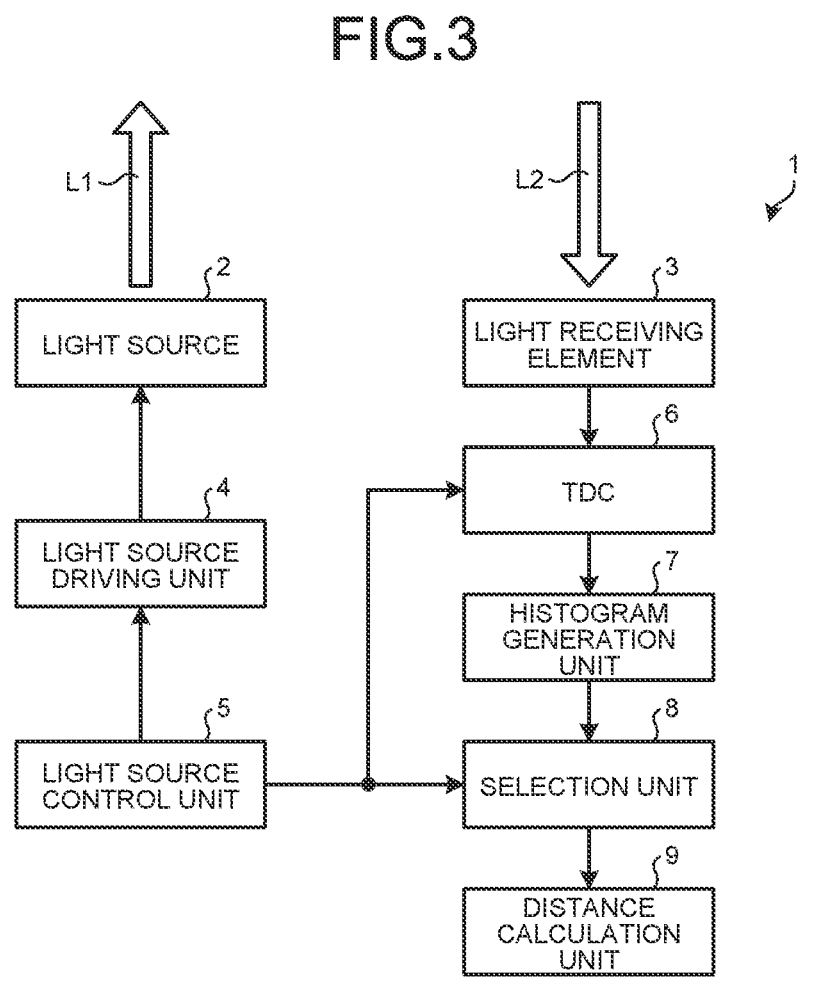

| LIGHT SOURCE | 2 |

| LIGHT RECEIVING ELEMENT | 3 |

| LIGHT SOURCE DRIVING UNIT | 4 |

| TDC | 6 |

| HISTOGRAM GENERATION UNIT | 7 |

| LIGHT SOURCE CONTROL UNIT | 5 |

| SELECTION UNIT | 8 |

| DISTANCE CALCULATION UNIT | 9 |

P1     P2     P3     P4

FRAME 1     FRAME 2     FRAME 3     FRAME 4

P1a     P2a     P3a     P4a

FRAME 1     FRAME 2     FRAME 3     FRAME 4

DISTANCE MEASUREMENT DEVICE AND DISTANCE MEASUREMENT METHOD

CROSS REFERENCE TO RELATED APPLICATIONS

This application is a U.S. National Phase of International Patent Application No. PCT/JP2020/023036 filed on Jun. 11, 2020, which claims priority benefit of Japanese Patent Application No. JP 2019-114472 filed in the Japan Patent Office on Jun. 20, 2019. Each of the above-referenced applications is hereby incorporated herein by reference in its entirety.

FIELD

The present disclosure relates to a distance measurement device and a distance measurement method.

BACKGROUND

As one of distance measurement methods for measuring a distance to an object to be measured by using light, a distance measurement method called a direct time of flight (ToF) method is known. According to the direct ToF method, light emitted from a light source and then reflected by an object to be measured is received by a light receiving element, and a distance to the object is measured on the basis of a time from the emission of the light to the reception of the reflected light.

Further, by randomly changing a light emission timing of light emitted from the light source, interference caused by light emitted from a distance measurement device of another vehicle can be suppressed (see, for example, Patent Literature 1).

CITATION LIST

Patent Literature

Patent Literature 1: Japanese Unexamined Patent Publication No. 2017-125682

SUMMARY

Technical Problem

However, conventionally, it is difficult to sufficiently prevent interference just by randomly changing a light emission timing in a case where a large number of vehicles are close to one another. Furthermore, according to the above conventional art, distance measurement data may be falsified by a malicious third party who performs different light emission following the light emission timing.

Therefore, the present disclosure proposes a distance measurement device and a distance measurement method capable of suppressing interference caused by another distance measurement device or the like.

Solution to Problem

According to the present disclosure, there is provided a distance measurement device. The distance measurement device includes a time measurement unit, a histogram generation unit, a light source control unit, a selection unit, and a distance calculation unit. The time measurement unit measures time information indicating a time from a light emission timing at which a light source emits light to a light reception timing at which a light receiving element receives light. The histogram generation unit generates a histogram based on the time information. The light source control unit dynamically changes a driving state of the light source. The selection unit selects one peak based on the driving state of the light source in a case where a plurality of peaks are detected in the histogram in one frame. The distance calculation unit calculates a distance to an object based on the selected peak.

Advantageous Effects of Invention

According to the present disclosure, interference caused by another distance measurement device or the like can be suppressed. Note that the effects described herein are not necessarily limited, and any of the effects described in the present disclosure may be produced.

BRIEF DESCRIPTION OF DRAWINGS

FIG. 3 is a block diagram illustrating an example of a configuration of a distance measurement device according to the embodiment of the present disclosure.

DESCRIPTION OF EMBODIMENTS

Hereinafter, an embodiment of the present disclosure will be described in detail with reference to the drawings. In embodiment below, identical parts are given identical reference signs, and repeated description thereof is omitted.

As one of distance measurement methods for measuring a distance to an object to be measured by using light, a distance measurement method called a direct time of flight (ToF) method is known. According to the direct ToF method, light emitted from a light source and then reflected by an object to be measured is received by a light receiving element, and a distance to the object is measured on the basis of a time from the emission of the light to the reception of the reflected light.

Further, by randomly changing a light emission timing of light emitted from a light source, interference caused by light emitted from a distance measurement device of another vehicle can be suppressed.

However, conventionally, it is difficult to sufficiently prevent interference just by randomly changing a light emission timing in a case where a large number of vehicles are close to one another. Furthermore, according to the above conventional art, distance measurement data may be falsified by a malicious third party who performs different light emission following the light emission timing.

Therefore, it is expected to realize a distance measurement device and a distance measurement method capable of overcoming the above problems and suppressing interference caused by another distance measurement device or the like.

[Distance Measurement Method]

The present disclosure relates to a technique for measuring a distance by using light. Therefore, in order to facilitate understanding of the embodiment of the present disclosure, a distance measurement method applicable to the embodiment will be described with reference to FIGS. 1 and 2.

Figures 1, 2:
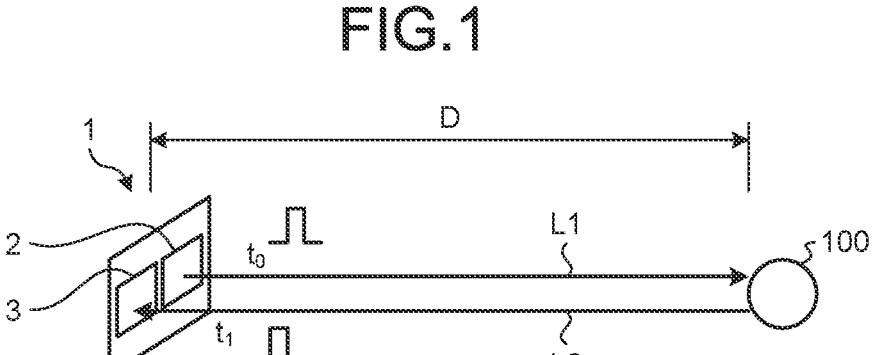
FIG. 1 is a diagram schematically illustrating distance measurement using a direct ToF method applicable to an embodiment of the present disclosure.
FIG. 2 is a diagram illustrating an example of a histogram based on a time of reception of light by a light receiving unit applicable to the embodiment of the present disclosure.

FIG. 1 is a diagram schematically illustrating distance measurement using a direct ToF method applicable to the embodiment of the present disclosure. In the embodiment, the direct ToF method is applied as a distance measurement method.

The direct ToF method is a method in which emitted light L1 is emitted from a light source 2 and is then reflected as a reflected light L2 by an object to be measured 100 and the reflected light L2 is received by a light receiving element 3, and a distance is measured on the basis of a time difference between the light emission timing and the light reception timing.

A distance measurement device 1 includes the light source 2 and the light receiving element 3. The light source 2 is, for example, a laser diode, and is driven to emit pulsed laser light.

The emitted light L1 emitted from the light source 2 is reflected by the object to be measured 100 and is then received by the light receiving element 3 as the reflected light L2. The light receiving element 3 converts light into an electrical signal by photoelectric conversion and outputs a signal corresponding to the received light.

A time (light emission timing) at which the light source 2 emits light is defined as a time to, and a time (light reception timing) at which the light receiving element 3 receives the reflected light L2, which is the emitted light L1 emitted from the light source 2 and reflected by the object to be measured 100, is defined as a time $t_1$.

A distance D between the distance measurement device 1 and the object to be measured 100 can be calculated by the following equation (1) where a constant c is a light velocity (2.9979×10$^8$ [m/sec]).

$$D=(c/2)\times(t_1-t_0) \tag{1}$$

More specifically, the distance measurement device 1 classifies times $t_m$ (hereinafter also referred to as "light receiving times $t_m$") from the time to of the light emission timing to the light reception timing at which light is received by the light receiving element 3 on the basis of classes (bins) to generate a histogram.

FIG. 2 is a diagram illustrating an example of a histogram based on a time of reception of light by the light receiving element 3, which is applicable to the embodiment of the present disclosure. In FIG. 2, the horizontal axis indicates bins, and the vertical axis indicates a frequency for each bin. A bin is a classification of the light receiving times $t_m$ per predetermined unit time d.

Specifically, a bin #0 is $0 \le t_m < d$, a bin #1 is $d \le t_m < 2 \times d$, a bin #2 is $2 \times d \le t_m < 3 \times d$, . . . , a bin #(N−2) is $(N-2) \times d \le t_m < (N-1) \times d$. In a case where an exposure time of the light receiving element 3 is a time $t_{ep}$, $t_{ep} = N \times d$.

The distance measurement device 1 counts the number of times of acquisition of the light receiving time $t_m$ on the basis of the bins, obtains a frequency 200 for each bin, and generates a histogram. Here, the light receiving element 3 also receives light other than the reflected light L2, which is the light L1 emitted from the light source 2 and then reflected.

The light other than the target reflected light L2 is, for example, ambient light around the distance measurement device 1. Such ambient light is light that randomly enters the light receiving element 3, and an ambient light component 201 resulting from the ambient light in the histogram is noise for the target reflected light L2.

On the other hand, the target reflected light L2 is light received according to a specific distance, and appears as an active light component 202 in the histogram. A bin corresponding to a peak frequency in the active light component 202 is a bin corresponding to the distance D to the object to be measured 100.

The distance measurement device 1 can calculate the distance D to the object to be measured 100 according to the above equation (1) by acquiring a representative time of the bin (for example, a central time of the bin) as the time $t_1$. In this way, appropriate distance measurement can be executed regardless of random noise by using a plurality of light reception results.

[Details of Distance Measurement Device]

Next, details of the distance measurement device 1 according to the embodiment will be described with reference to FIGS. 3 to 10. FIG. 3 is a block diagram illustrating an example of a configuration of the distance measurement device 1 according to the embodiment of the present disclosure.

As illustrated in FIG. 3, the distance measurement device 1 includes the light source 2, the light receiving element 3, a light source driving unit 4, a light source control unit 5, a time to digital converter (TDC) 6, a histogram generation unit 7, a selection unit 8, and a distance calculation unit 9. The TDC 6 is an example of a time measurement unit.

The light source 2 is, for example, constituted by laser diodes such as Vertical Cavity Surface Emitting Lasers (VCSELs). Note that the light source 2 is not limited to the VCSELs, and a laser diode array or the like in which laser diodes are arranged on a line may be used.

The light receiving element 3 converts light into an electrical signal by photoelectric conversion and outputs a signal corresponding to the received light. The light receiving element 3 includes, for example, a plurality of single photon avalanche diode (SPAD) elements arranged in a two-dimensional lattice pattern.

In such a SPAD element, when a large reverse bias voltage at which avalanche multiplication occurs is applied to a cathode, avalanche multiplication occurs inside due to an electron generated in response to incidence of one photon.

That is, the SPAD element has a characteristic that a large current flows in response to incidence of one photon. The SPAD element can detect incidence of one photon included in the reflected light L2 with high sensitivity by using such characteristic. A signal generated by the SPAD element of the light receiving element 3 is supplied to the TDC 6.

The light source driving unit 4 drives the light source 2. For example, the light source driving unit 4 drives the light source 2 so that the emitted light L1 having a predetermined timing and a pulse width is emitted from the light source 2 based on a light emission control signal from the light source control unit 5.

The light source driving unit 4 can, for example, drive the light source 2 so that laser light from the light source 2 having laser diodes arranged on a line is scanned in a direction perpendicular to the line. Details of the light source driving unit 4 will be described later.

The light source control unit 5 controls whole operation of the distance measurement device 1 according to, for example, a program incorporated in advance. For example, the light source control unit 5 controls a light emission timing and a pulse width of the light source 2 by controlling a pulse generation circuit 28 (see FIG. 4) of the light source driving unit 4.

Furthermore, the light source control unit 5 controls operation of the plurality of SPAD elements in the light receiving element 3. For example, the light source control unit 5 can control reading of signals from the SPAD elements for each block of n pixels in a row direction and m pixels in a column direction including (n×m) SPAD elements.

Furthermore, the light source control unit 5 can read a signal from each SPAD element by scanning the SPAD elements in the row direction and further scanning the SPAD elements in the column direction for each row per block. In the embodiment, the light source control unit 5 may independently read signals from the SPAD elements.

Figure 4:
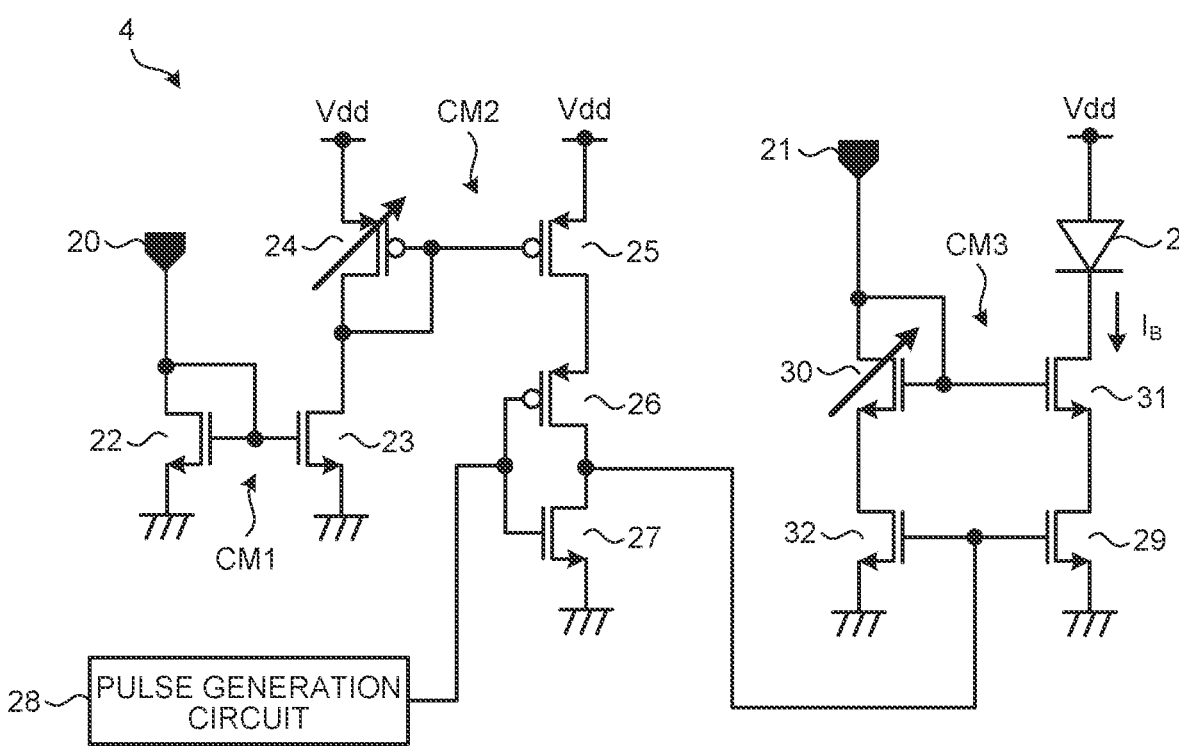
FIG. 4 is a circuit diagram illustrating an example of configurations of a light source driving unit and a light source according to the embodiment of the present disclosure.

Here, the light source control unit 5 according to the embodiment dynamically changes a driving state of the light source 2 by controlling the operation of the light source driving unit 4. Therefore, hereinafter, a circuit configuration of the light source driving unit 4 and the light source 2 controlled by the light source control unit 5 will be described with reference to FIG. 4. FIG. 4 is a circuit diagram illustrating an example of configurations of the light source driving unit 4 and the light source 2 according to the embodiment of the present disclosure.

As illustrated in FIG. 4, the light source driving unit 4 according to the embodiment includes reference current sources 20 and 21, n-type transistors 22, 23, 27, 29, 30, 31, and 32, p-type transistors 24, 25, and 26, and the pulse generation circuit 28.

The reference current sources 20 and 21 generate a predetermined reference current. The reference current source 20 is connected to a drain of the n-type transistor 22. The reference current generated by the reference current source 20 is copied by a current mirror circuit CM1 from the n-type transistor 22 to the n-type transistor 23.

A drain of the n-type transistor 23 is connected to a drain of the p-type transistor 24. A source of the p-type transistor 24 is connected to a power supply voltage Vdd, and a gate of the p-type transistor is connected to a gate of the p-type transistor 25 and the drain of the p-type transistor 24. That is, the p-type transistors 24 and 25 constitute a current mirror circuit CM2.

Note that the p-type transistor 24 includes a predetermined number of p-type transistors connected in parallel. The light source control unit 5 can control a current mirror ratio of the current mirror circuit CM2 constituted by the p-type transistors 24 and 25 by controlling the number of p-type transistors in an on state in the p-type transistor 24.

A source of the p-type transistor 25 is connected to the power supply voltage Vdd, and a drain of the p-type transistor 25 is connected to a source of the p-type transistor 26. Furthermore, the p-type transistor 26 and the n-type transistor 27 constitute a complementary metal-oxide-semiconductor (CMOS) circuit.

An input terminal of the CMOS circuit is connected to the pulse generation circuit 28. The pulse generation circuit 28 generates a pulse signal. The light source control unit 5 can control a pulse width and a pulse period of the pulse signal generated by the pulse generation circuit 28.

An output terminal of the CMOS circuit constituted by the p-type transistor 26 and the n-type transistor 27 is connected to a gate of the n-type transistor 29.

A pulse signal whose pulse width and pulse period are controlled by the pulse generation circuit 28 and whose pulse rise time is controlled by the current mirror ratio of the current mirror circuit CM2 is input to the gate of the n-type transistor 29. A shape of the pulse signal input to the gate of the n-type transistor 29 is controlled by the light source control unit 5.

The reference current source 21 is connected to a drain of the n-type transistor 30. The reference current generated by the reference current source 21 is copied by a current mirror circuit CM3 from the n-type transistor 30 to the n-type transistor 31. Note that the n-type transistor 32 connected in series with the n-type transistor 30 is normally maintained in an on state.

Note that the n-type transistor 30 includes a predetermined number of n-type transistors connected in parallel. The light source control unit 5 can control a current mirror ratio of the current mirror circuit CM3 constituted by the n-type transistors 30 and 31 by controlling the number of n-type transistors in an on state in the n-type transistor 30.

An anode of light source 2, which is laser diodes, is connected to the power supply voltage Vdd, and a cathode of the light source 2 is connected to a drain of the n-type transistor 31. Furthermore, a source of the n-type transistor 31 is connected to a drain of the n-type transistor 29, and a source of the n-type transistor 29 is grounded. That is, the light source 2, the n-type transistor 31, and the n-type transistor 29 are connected in series between the power supply voltage Vdd and the ground potential.

By the circuit described so far, an upper limit value of a drive current $I_B$ for driving the light source 2 is controlled by the current mirror ratio of the current mirror circuit CM3, and a waveform of the drive current $T_B$ is controlled by the pulse signal input to the gate of the n-type transistor 29.

Figure 5:
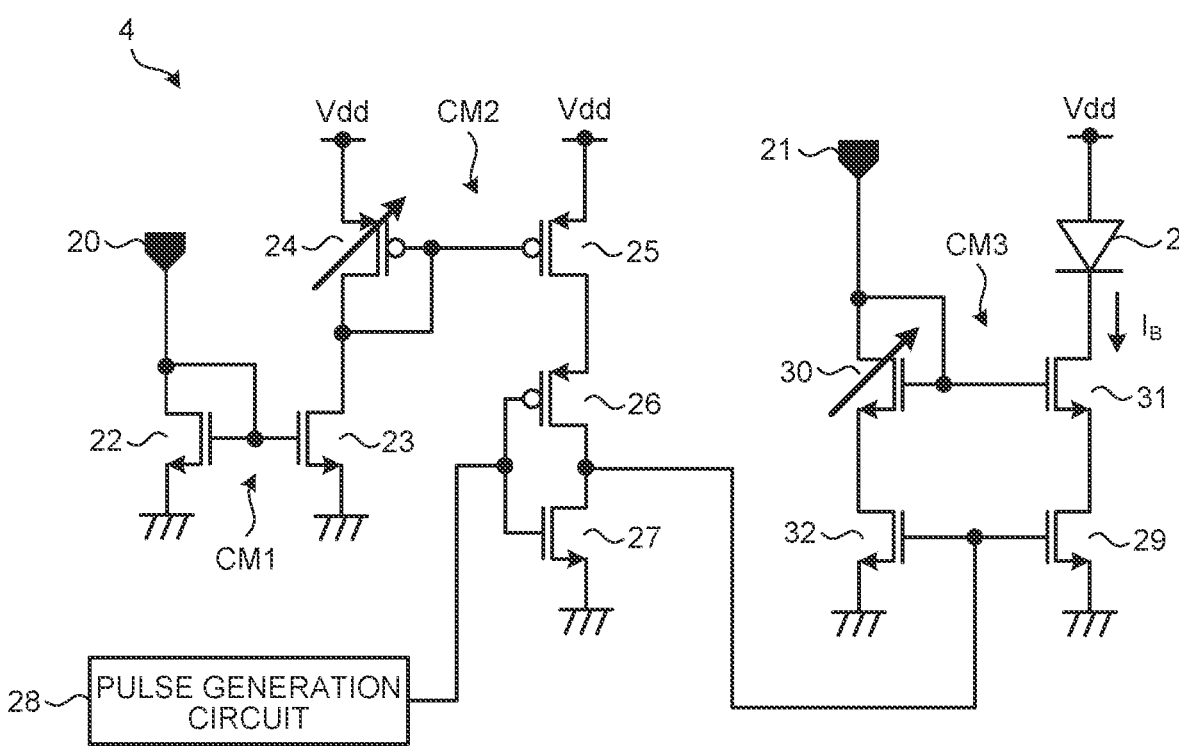
FIG. 5 is a diagram illustrating an example of a drive current for driving the light source according to the embodiment of the present disclosure.

For example, as illustrated in FIG. 5, the light source control unit 5 can control the upper limit value and a rise time of the drive current $I_B$ for driving the light source 2 in various ways. FIG. 5 is a diagram illustrating an example of the drive current $T_B$ for driving the light source 2 according to the embodiment of the present disclosure.

That is, the light source control unit 5 according to the embodiment can dynamically change the driving state of the light source 2 by controlling the two current mirror circuits CM2 and CM3 and controlling the pulse width and the pulse period of the pulse signal output from the pulse generation circuit 28.

Although an example in which the light source control unit 5 controls the upper limit value and the rise time of the drive current $I_B$ has been described in the embodiment, a fall time of the drive current $I_B$ may be additionally controlled. Furthermore, the example of FIG. 4 is merely an example of the light source driving unit 4, and a circuit having a different configuration may be used as the light source driving unit 4.

See FIG. 3 again. The TDC 6 converts a pixel signal supplied from the light receiving element 3 into time information indicating a timing. Specifically, the TDC 6 regards a light emission timing of the light source 2 sent from the light source control unit 5 as the time to (see FIG. 2).

Then, based on the time to, the TDC 6 measures a time from the light emission timing at which the light source 2 emits light to the light reception timing at which the light receiving element 3 receives light, and outputs the measured result as time information, which is a digital value.

The histogram generation unit 7 generates a histogram as illustrated in FIG. 2 based on the time information output from the TDC 6. Specifically, the histogram generation unit 7 classifies the time information transmitted from the TDC 6 according to the histogram and increments a value of a corresponding bin of the histogram.

Then, a series of processing such as output of a light emission command to the light source driving unit 4, light emission of the light source 2 in response to the light emission command, conversion to time information by the TDC 6, and increment of a bin of the histogram based on the time information by the histogram generation unit 7 is repeated a predetermined number of times (for example, tens of thousands of times). This completes generation of the histogram per frame by the histogram generation unit 7.

In a case where a plurality of peaks are detected in the histogram in one frame, the selection unit 8 selects one peak on the basis of the driving state of the light source 2 controlled by the light source control unit 5. A specific operation of the selection unit 8 will be described later.

The distance calculation unit 9 calculates the distance D to the object by the above equation (1) based on the one peak selected by the selection unit 8.

Figure 6:
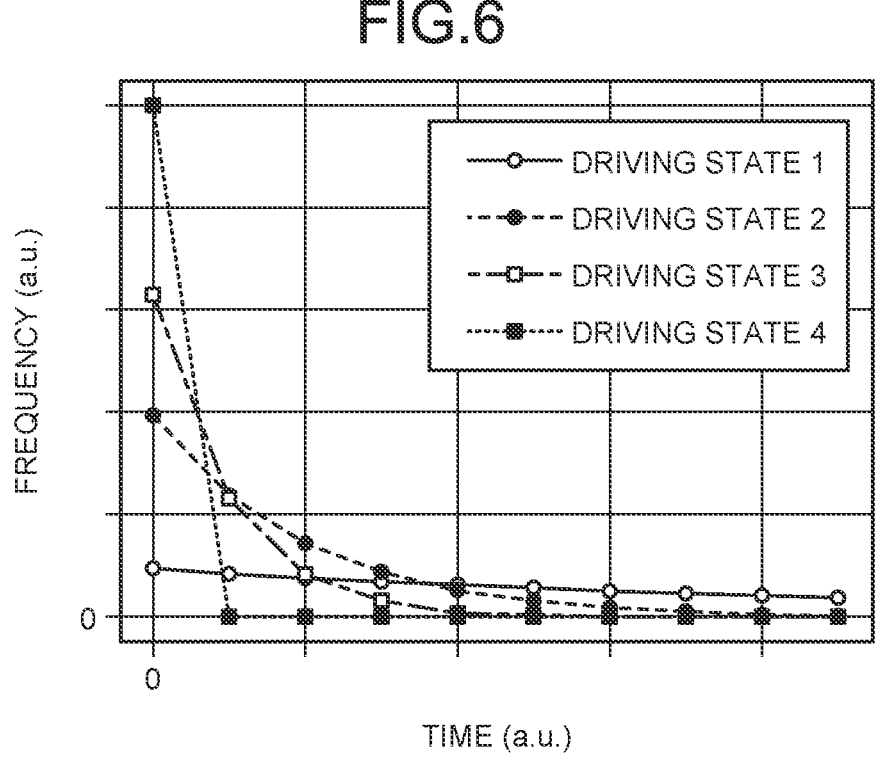
FIG. 6 is a diagram illustrating an example of a pulse shape of light emitted from the light source according to the embodiment of the present disclosure.

Next, a specific operation of the selection unit 8 will be described with reference to FIGS. 6 to 10. FIG. 6 is a view illustrating an example of a pulse shape of the emitted light L1 emitted from the light source 2 according to the embodiment of the present disclosure.

In the present disclosure, four kinds of pulse shapes of the emitted light L1 emitted from the light source 2 are set as an example of input conditions for simulation. These pulse shapes are pulse shapes of the emitted light L1 emitted from the light source 2 controlled to four types of driving states 1 to 4 by the light source control unit 5.

As illustrated in FIG. 6, in the present disclosure, the pulse shapes are set so that a rise time and a fall time of the pulse of the emitted light L1 become shorter as the driving state of the light source 2 changes from the driving state 1 to the driving states 2, 3, and 4.

Figure 7:
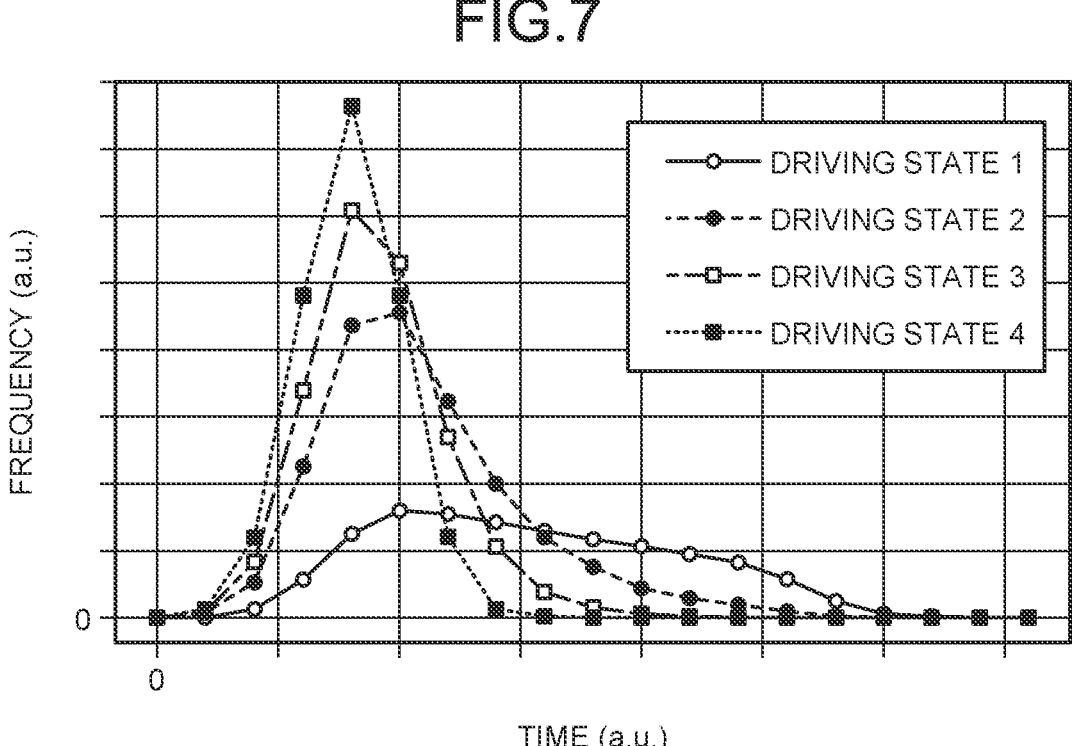
FIG. 7 is a diagram illustrating an example of a histogram generated by a histogram generation unit according to the embodiment of the present disclosure.

FIG. 7 is a diagram illustrating an example of a histogram generated by the histogram generation unit 7 according to the embodiment of the present disclosure. Specifically, FIG. 7 illustrates a simulation result of histograms generated on the basis of the reflected light L2 resulting from the emitted light L1 controlled to the above driving state 1 to 4.

As is clear from FIG. 7, an intensity of a peak increases and dispersion decreases in the generated histogram as the driving state of the light source 2 changes from the driving state 1 to the driving states 2, 3, and 4.

Furthermore, kurtosis of the peak increases and skewness decreases in the generated histogram as the driving state of the light source 2 changes from the driving state 1 to the driving states 2, 3, and 4.

Furthermore, symmetry of the peak becomes better and a tailing degree decreases in the generated histogram as the driving state of the light source 2 changes from the driving state 1 to the driving states 2, 3, and 4.

That is, in the embodiment, an intensity of a peak and summary statistics (for example, dispersion, skewness, kurtosis, asymmetry, tailing degree, average, mode, median, and the like) in a histogram generated by the histogram generation unit 7 can be controlled by controlling the driving state of the light source 2. In the following description, the intensity of the peak and the summary statistic are also collectively referred to as a "peak shape".

Figure 8:
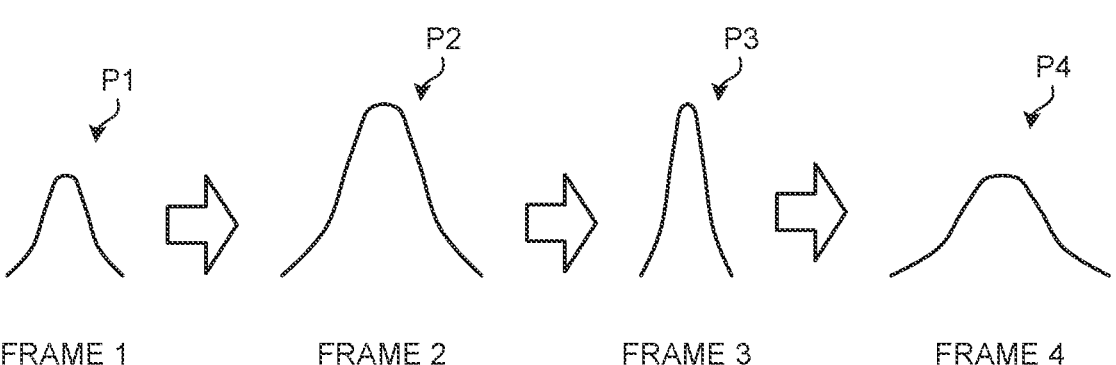
FIG. 8 is a diagram for explaining a change in peak shape of a histogram caused by the present device according to the embodiment of the present disclosure.

In the embodiment, the light source control unit 5 dynamically changes an intensity of a peak and summary statistic (that is, a peak shape) obtained for each frame by dynamically changing the driving state of the light source 2. FIG. 8 is a diagram for explaining a change in the peak shape in the histogram caused by the present device according to the embodiment of the present disclosure.

For example, as illustrated in FIG. 8, the light source control unit 5 controls the driving state of the light source 2 so that a peak P1 having a low intensity is obtained in a frame 1, and controls the driving state of the light source 2 so that a peak P2 having a higher intensity than and an identical dispersion to the previous peak P1 is obtained in a frame 2.

Furthermore, the light source control unit 5 controls the driving state of the light source 2 so that a peak P3 having an identical intensity to and a smaller dispersion than the previous peak P2 is obtained in a frame 3, and controls the driving state of the light source 2 so that a peak P4 having a smaller intensity and a larger dispersion than the previous peak P3 is obtained in a frame 4.

Figure 9:
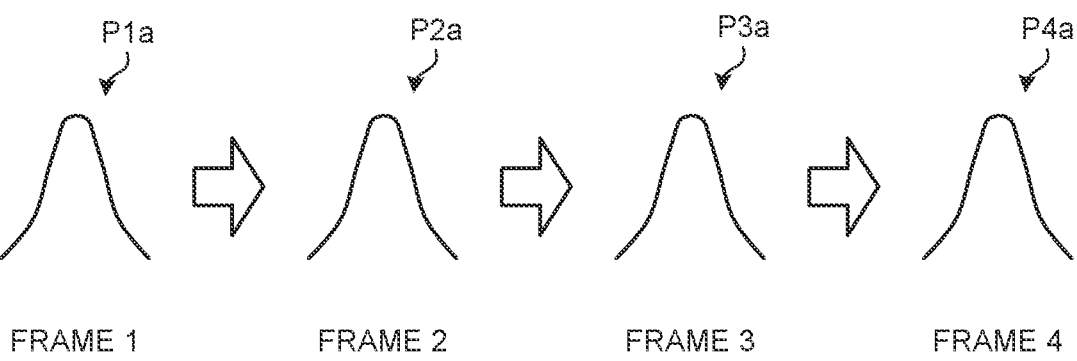
FIG. 9 is a diagram for explaining a change in peak shape of a histogram caused by another device according to the embodiment of the present disclosure.

FIG. 9 is a diagram for explaining a change in the peak shape in the histogram caused by another device according to the embodiment of the present disclosure. Even if the other device can cause light to enter at a timing synchronized with the emitted light L1 resulting from the present device, it is difficult for the other device to cause light synchronized with the emitted light L1 in terms of an intensity and summary statistics to enter the present device.

This is because it takes time for the other device that has measured the emitted light L1 and the reflected light L2 to measure intensities and summary statistics of the emitted light L1 and the reflected light L2 and emit another light synchronized with the intensities and summary statistics of the emitted light L1 and the reflected light L2, and therefore synchronization with the dynamically changed peak shape is difficult.

Therefore, as illustrated in FIG. 9, all of peaks Pla to P4*a* in the histograms of the frames 1 to 4 resulting from the other device have substantially the same intensity and summary statistics.

Figure 10:
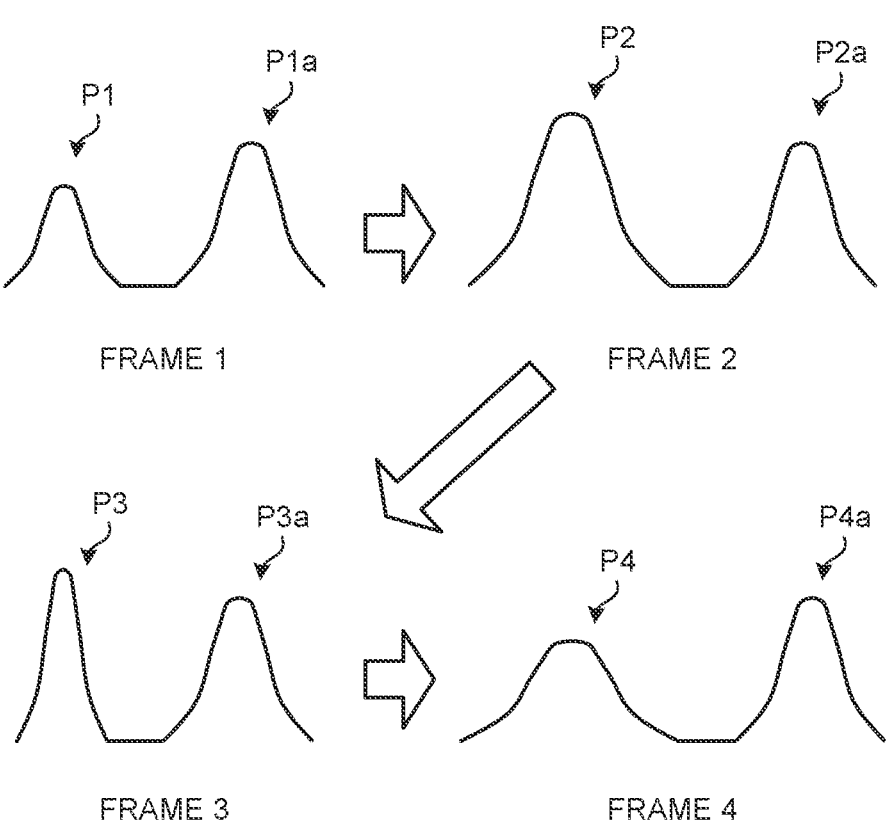
FIG. 10 is a diagram for explaining a change in a histogram generated by a histogram generation unit according to the embodiment of the present disclosure.

In a case where both the reflected light L2 resulting from the present device and the light resulting from the other device are incident on the light receiving element 3, a plurality of peaks are detected in one frame as illustrated in FIG. 10. For example, the peak P1 and the peak P1*a* described above are detected in the frame 1, the peak P2 and the peak P2*a* are detected in the frame 2, the peak P3 and the peak Pia are detected in the frame 3, and the peak P4 and the peak P4*a* are detected in the frame 4.

Here, the selection unit 8 according to the embodiment selects one peak of higher adequacy from among a plurality of peaks detected in one frame on the basis of information regarding the driving state of the light source 2 sent from the light source control unit 5.

For example, the light source control unit 5 sends information indicating that "the peak detected in the frame 2 has an identical dispersion to and a higher intensity than the peak detected in the frame 1" to the selection unit 8.

Further, the selection unit 8 compares the peak shape of the peak P1 in the frame 1 and the peak shape of the peak P2 in the frame 2, and compares the peak shape of the peak P1*a* in the frame 1 and the peak shape of the peak P2*a* in the frame 2.

By using the information regarding the driving state sent from the light source control unit 5, the selection unit 8 can select the peak P1 of high adequacy from the histogram in the frame 1 and can select the peak P2 of high adequacy from the histogram in the frame 2.

Similarly, the selection unit 8 can select the peak P3 of high adequacy from the histogram in the frame 3 by comparing the peaks P2 and P2*a* in the frame 2 with the peaks P3 and P3*a* in the frame 3, respectively.

Similarly, the selection unit 8 can select the peak P4 of high adequacy from the histogram in the frame 4 by comparing the peaks P3 and P3*a* in the frame 3 with the peaks P4 and P4*a* in the frame 4, respectively.

For example, the selection unit 8 plots summary statistics (for example, dispersion) of peaks detected in each frame. In a case where movement of a polygonal line formed by the plotting matches movement predicted from the driving state of the light source 2, the selection unit 8 can determine a peak forming the polygonal line as a peak of high adequacy.

Note that the number of types of summary statistics to be used is not limited to one in the above method, and a peak of higher adequacy can be selected by comparison with movement predicted from the driving state of the light source 2 by using plural types of summary statistics in a multidimensional manner.

Furthermore, in a case where the light source control unit 5 dynamically changes the driving state of the light source 2 so that a difference in summary statistics becomes large, movement of a polygonal line becomes large, and therefore the selection unit 8 can accurately determine a peak of high adequacy.

Then, the distance calculation unit 9 calculates the distance D to the object not based on the peaks P1*a* to P4*a* resulting from the other device that are not selected by the selection unit 8, but based on the peaks P1 to P4 resulting from the present device selected by the selection unit 8.

As described above, in the embodiment, in a case where a plurality of peaks are detected in one frame, a peak resulting from the emitted light L1 emitted from the present device can be selected by determining, for each frame, whether or not a peak shape matches the driving state of the light source 2. Therefore, according to the embodiment, interference caused by another distance measurement device or the like can be suppressed.

Although an example in which one peak is selected from among a plurality of separate peaks as illustrated in FIG. 10 has been described in the embodiment, one peak may be selected from among a plurality of peaks detected in an overlapping manner. In this case, for example, it is only necessary to separate overlapping peaks by using an existing method and select one peak from among the plurality of separated peaks.

Furthermore, an example in which adequacy of a peak is determined by relatively comparing summary statistics of peaks detected in different frames has been described in the embodiment, one peak may be selected on the basis of absolute values of summary statistics of a plurality of peaks detected in one frame.

For example, it is known that a dispersion value of a peak resulting from light directly incident from the other device is very small as compared with a peak resulting from the reflected light L2 from the object. In view of this, in a case where a dispersion value of a certain peak is very small as compared with dispersion values of other peaks as a result of comparison among dispersion values of a plurality of peaks detected in one frame, such a peak can be regarded as a peak resulting from light directly incident from the other device and can be excluded from selection candidates.

In the embodiment, the light source control unit 5 desirably changes the driving state of the light source 2 randomly. For example, the light source control unit 5 according to the embodiment can randomly change the driving state of the light source 2 by including an output result of a random number generator (not illustrated) in a process of determining the driving state of the light source 2.

In the embodiment, this makes it possible to suppress interference caused by the other device even when the other device predicts the driving state of the light source 2 on the basis of a past driving state of the light source 2 and attempts to achieve synchronization with a peak shape of the present device. Therefore, according to the embodiment, interference caused by another distance measurement device or the like can be effectively suppressed.

In the embodiment, the light source control unit 5 desirably changes the driving state of the light source 2 by changing at least one of the pulse width, the rise time, and the fall time of the driving current $I_B$ for driving the light source 2.

This makes it possible to change the driving state of the light source 2 by using a simple circuit like the one illustrated in FIG. 4, and therefore it is possible to reduce an area of a circuit required for the distance measurement device 1. Therefore, according to the embodiment, a manufacturing cost of the distance measurement device 1 can be reduced.

In the embodiment, the driving state of the light source 2 may be changed by changing other than the pulse width, the rise time, and the fall time of the driving current $I_B$.

Further, in the embodiment, the selection unit 8 desirably selects one peak from a plurality of peaks based on at least one summary statistic selected from the group consisting of dispersion, skewness, kurtosis, asymmetry, and a tailing degree of a peak. This is because, these five types of summary statistics are summary statistics that can be accurately controlled by controlling the driving state of the light source 2, as illustrated in FIG. 7.

That is, in the embodiment, a peak of high adequacy can be accurately selected based on at least one of these five types of summary statistics. Therefore, according to the embodiment, interference caused by another distance measurement device or the like can be effectively suppressed.

In the embodiment, one peak may be selected from a plurality of peaks based on a summary statistic other than dispersion, skewness, kurtosis, asymmetry, and a tailing degree of a peak. For example, one peak may be selected by using at least one summary statistic selected from the group consisting of an average, a mode, and a median in addition to at least one of the five summary statistics. As a result, interference caused by another distance measurement device or the like can be more effectively suppressed.

Furthermore, in the embodiment, the selection unit 8 may select one peak from among a plurality of peaks by executing machine learning. Specifically, the selection unit 8 generates a learning model for summary statistics of a peak corresponding to the driving state of the light source 2 by executing machine learning on the basis of information regarding the driving state of the light source 2 and information regarding summary statistics of a peak in the driving state. The selection unit 8 stores information on the generated learning model in a storage unit (not illustrated).

In a case where a plurality of peaks are detected in one frame, the selection unit 8 can select one peak on the basis of summary statistics of the plurality of peaks and the generated learning model.

In this manner, by executing machine learning and selecting one peak, a peak of high adequacy can be accurately selected. Therefore, according to the embodiment, interference caused by another distance measurement device or the like can be effectively suppressed.

In the embodiment, in a case where a plurality of peaks are not detected in a histogram in one frame, the selection unit 8 is desirably disabled. By thus stopping operation of the selection unit 8 in a case where a plurality of peaks are not detected and there is no risk of interference, power consumed by the selection unit 8 can be reduced.

Therefore, according to the embodiment, power consumption of the distance measurement device 1 can be reduced.

[Details of Distance Measurement Processing]

Figure 11:
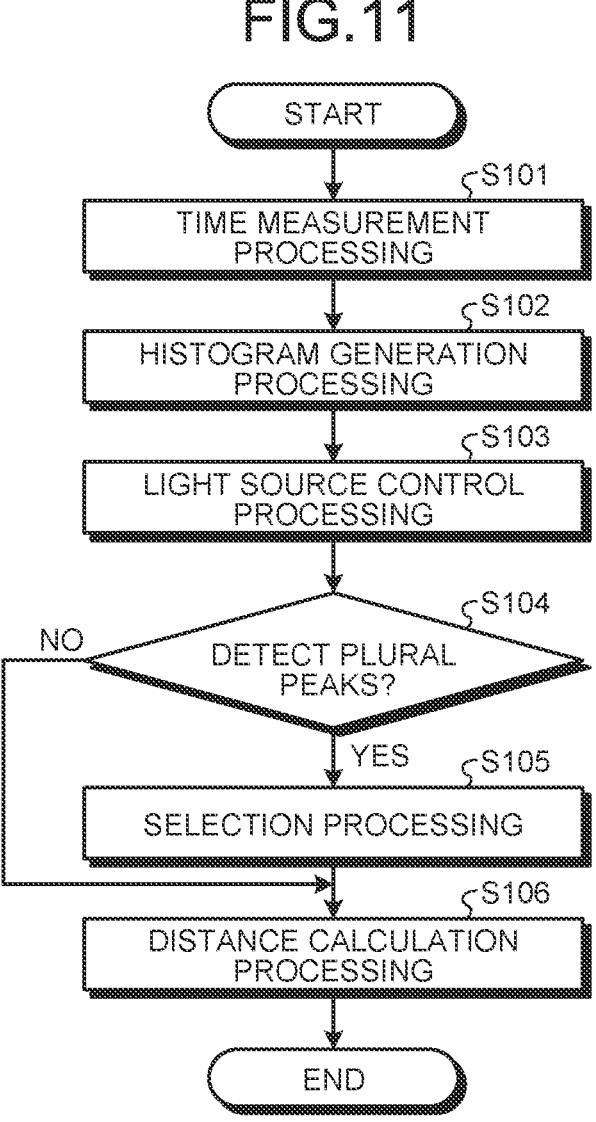
FIG. 11 is a flowchart illustrating a processing procedure of distance measurement processing according to the embodiment.

Next, details of the distance measurement processing executed by the distance measurement device 1 according to the embodiment will be described with reference to FIG. 11. FIG. 11 is a flowchart illustrating a processing procedure of the distance measurement processing according to the embodiment.

First, the TDC 6 performs time measurement processing for measuring time information indicating a time from a light emission timing at which the light source 2 emits light to a light reception timing at which the light receiving element 3 receives light (step S101).

Specifically, the TDC 6 regards the light emission timing of the light source 2 transmitted from the light source control unit 5 as a time to, and measures a time from the light emission timing at which the light source 2 emits light to a light reception timing at which the light receiving element 3 receives light on the basis of the time to. Then, the TDC 6 outputs the measured result to the histogram generation unit 7 as time information, which is a digital value.

Next, the histogram generation unit 7 performs histogram generation processing for generating a histogram based on the time information (step S102). Specifically, the histogram generation unit 7 classifies the time information transmitted from the TDC 6 according to the histogram and increments a value of a corresponding bin of the histogram.

Then, light emission of the light source 2 in response to a light emission command, conversion into time information by the TDC 6, and increment by the histogram generation unit 7 are repeated a predetermined number of times, and thereby generation of a histogram per frame by the histogram generation unit 7 is completed.

Next, the light source control unit 5 performs light source control processing for dynamically changing the driving state of the light source 2 (step S103). Specifically, the light source control unit 5 dynamically changes the driving state of the light source 2 by controlling the two current mirror circuits CM2 and CM3 and controlling a pulse width and a pulse period of a pulse signal output from the pulse generation circuit 28.

Then, the light source control unit 5 dynamically changes a peak shape obtained for each frame by dynamically changing the driving state of the light source 2.

Next, the selection unit 8 determines whether or not a plurality of peaks are detected in a histogram in one frame (step S104). In a case where a plurality of peaks are detected in a histogram in one frame (step S104, Yes), the selection unit 8 performs selection processing for selecting one peak on the basis of the driving state of the light source 2 (step S105).

Next, the distance calculation unit 9 performs distance calculation processing for calculating the distance D to the object on the basis of the selected peak (step S106) and ends the series of distance measurement processing.

Meanwhile, in a case where a plurality of peaks are not detected in a histogram in one frame (step S104, No), the distance calculation unit 9 calculates the distance D to the object based on the detected one peak (step S106). That is, in a case where a plurality of peaks are not detected in a histogram in one frame, the selection unit 8 does not perform the selection processing.

Effects

The distance measurement device 1 according to the embodiment includes the time measurement unit (TDC 6), the histogram generation unit 7, the light source control unit 5, the selection unit 8, and the distance calculation unit 9. The time measurement unit (TDC 6) measures time information indicating a time from a light emission timing at which the light source 2 emits light to a light reception timing at which the light receiving element 3 receives light. The histogram generation unit 7 generates a histogram based on the time information. The light source control unit 5 dynamically changes the driving state of the light source 2. In a case where a plurality of peaks are detected in a histogram in one frame, the selection unit 8 selects one peak on the basis of the driving state of the light source 2. The distance calculation unit 9 calculates the distance D to the object based on the selected peak.

As a result, interference caused by another distance measurement device or the like can be suppressed.

Furthermore, in the distance measurement device 1 according to the embodiment, the light source control unit 5 randomly changes the driving state of the light source 2.

As a result, interference caused by another distance measurement device or the like can be effectively suppressed.

Furthermore, in the distance measurement device 1 according to the embodiment, the light source control unit 5 changes the driving state of the light source 2 by changing at least one of a pulse width, a rise time, and a fall time of a current for driving the light source 2.

As a result, an area of a circuit required for the distance measurement device 1 can be reduced, and therefore a manufacturing cost of the distance measurement device 1 can be reduced.

Furthermore, in the distance measurement device 1 according to the embodiment, the selection unit 8 selects one peak on the basis of at least one summary statistic selected from the group consisting of dispersion, skewness, kurtosis, asymmetry, and tailing degrees of a plurality of peaks.

As a result, interference caused by another distance measurement device or the like can be effectively suppressed.

Furthermore, in the distance measurement device 1 according to the embodiment, the selection unit 8 selects one peak from a learning model generated by using information regarding the dynamically changed driving state of the light source 2 and information regarding summary statistics of a peak in a histogram.

As a result, interference caused by another distance measurement device or the like can be effectively suppressed.

Furthermore, the distance measurement device 1 according to the embodiment disables the selection unit 8 in a case where a plurality of peaks are not detected in a histogram in one frame.

As a result, power consumption of the distance measurement device 1 can be reduced.

The distance measurement method according to the embodiment includes a time measurement step (step S101), a histogram generation step (step S102), a light source control step (step S103), a selection step (step S104), and a distance calculation step (step S105). In the time measurement step (step S101), time information indicating a time from a light emission timing at which the light source 2 emits light to a light reception timing at which the light receiving element 3 receives light is measured. In the histogram generation step (step S102), a histogram based on the time information is generated. In the light source control step (step S103), the driving state of the light source 2 is dynamically changed. In the selection step (step S104), in a case where a plurality of peaks are detected in a histogram in one frame, one peak is selected based on the driving state of the light source 2. In the distance calculation step (step S105), the distance D to the object is calculated based on the selected peak.

As a result, interference caused by another distance measurement device or the like can be suppressed.

[Application Example to Mobile Body]

The technique according to the present disclosure (present technology) can be applied to various products. For example, the technique according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 12:
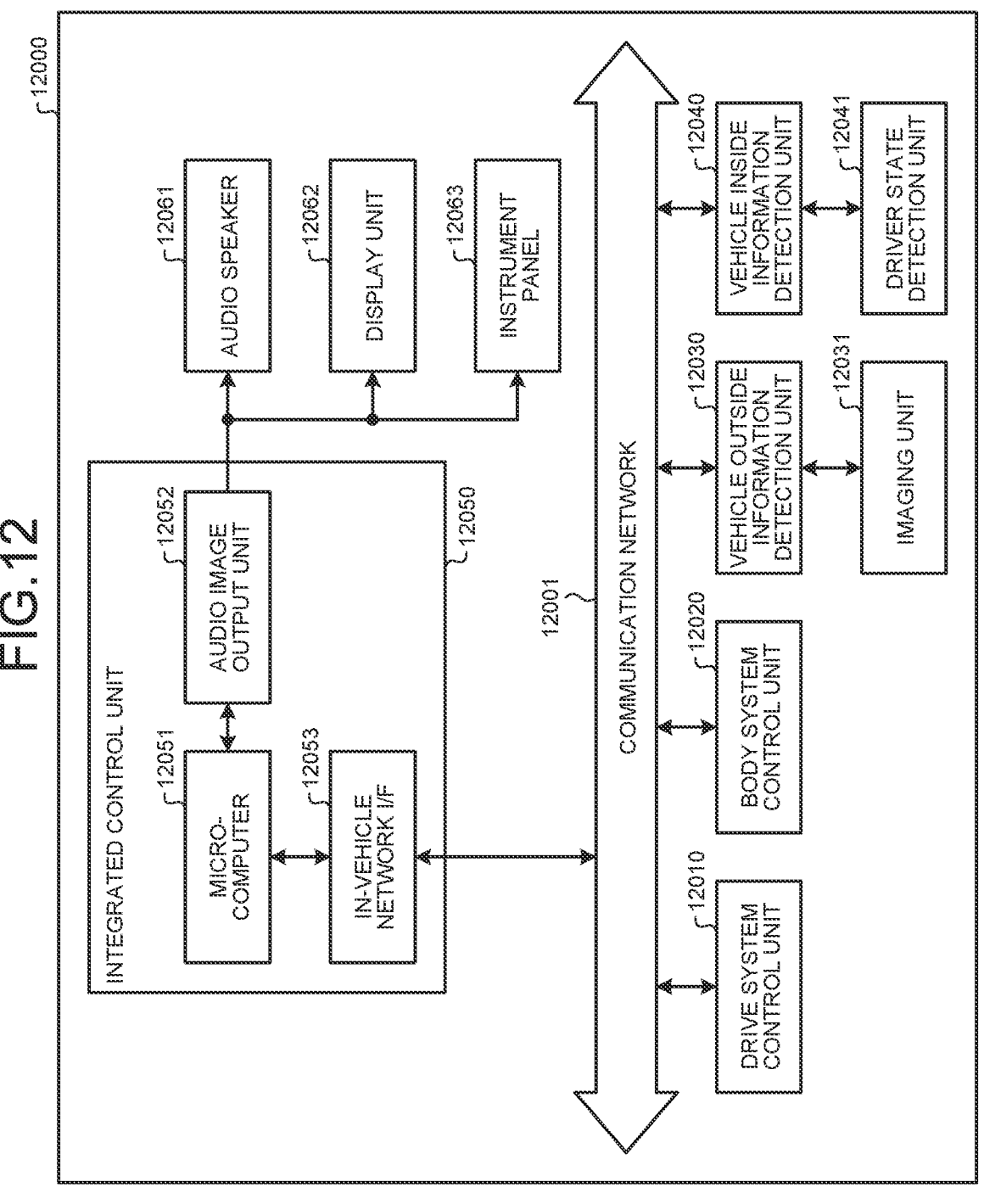
FIG. 12 is a block diagram illustrating an example of a schematic configuration of a vehicle control system.

FIG. 12 is a block diagram illustrating a schematic configuration example of a vehicle control system which is an example of a mobile body control system to which the technique according to the present disclosure can be applied.

A vehicle control system 12000 includes a plurality of electronic control units connected over a communication network 12001. In the example illustrated in FIG. 12, the vehicle control system 12000 includes a drive system control unit 12010, a body system control unit 12020, a vehicle outside information detection unit 12030, a vehicle inside information detection unit 12040, and an integrated control unit 12050. Furthermore, a microcomputer 12051, an audio image output unit 12052, and an in-vehicle network interface (I/F) 12053 are illustrated as functional elements of the integrated control unit 12050.

The drive system control unit 12010 controls operation of devices related to a drive system of a vehicle in accordance with various programs. For example, the drive system control unit 12010 functions as a control device for a driving force generation device for generating driving force for the vehicle such as an internal combustion engine or a driving motor, a driving force transmission mechanism for transmitting the driving force to wheels, a steering mechanism for adjusting a steering angle of the vehicle, a braking device for generating braking force of the vehicle, and the like.

The body system control unit 12020 controls operations of various devices mounted on a vehicle body in accordance with various programs. For example, the body system control unit 12020 functions as a control device for controlling a keyless entry system, a smart key system, a power window device, or various lamps such as a head lamp, a back lamp, a brake lamp, a blinker, and a fog lamp. In this case, radio waves transmitted from a portable device that substitutes for a key or signals of various switches can be input to the body system control unit 12020. The body system control unit 12020 receives input of these radio waves or signals and controls a door lock device, a power window device, a lamp, and the like of the vehicle.

The vehicle outside information detection unit 12030 detects information outside the vehicle on which the vehicle control system 12000 is mounted. For example, an imaging unit 12031 is connected to the vehicle outside information detection unit 12030. The vehicle outside information detection unit 12030 causes the imaging unit 12031 to take an image of the outside of the vehicle and receives the taken image. The vehicle outside information detection unit 12030 may perform object detection processing or distance detection processing of a person, a vehicle, an obstacle, a sign, a character on a road surface, or the like on the basis of the received image.

The imaging unit 12031 is an optical sensor that receives light and outputs an electric signal corresponding to an amount of the received light. The imaging unit 12031 can output the electric signal as an image or can output the electric signal as distance measurement information. Furthermore, the light received by the imaging unit 12031 may be visible light or may be invisible light such as infrared rays.

The vehicle inside information detection unit 12040 detects information inside the vehicle. For example, a driver state detection unit 12041 that detects a state of a driver is connected to the vehicle inside information detection unit 12040. The driver state detection unit 12041 includes, for example, a camera that images the driver, and the vehicle inside information detection unit 12040 may calculate a degree of fatigue or a degree of concentration of the driver or may determine whether or not the driver is dozing off on the basis of detection information input from the driver state detection unit 12041.

The microcomputer 12051 can calculate a control target value for the driving force generation device, the steering mechanism, or the braking device on the basis of the information inside or outside the vehicle acquired by the vehicle outside information detection unit 12030 or the vehicle inside information detection unit 12040, and output a control command to the drive system control unit 12010. For example, the microcomputer 12051 can perform cooperative control for the purpose of realizing functions of an advanced driver assistance system (ADAS) including vehicle collision avoidance or impact mitigation, vehicle following based on an inter-vehicle distance, vehicle speed maintenance, vehicle collision warning, vehicle lane departure warning, and the like.

Furthermore, the microcomputer 12051 can perform cooperative control for the purpose of automatic driving or the like in which the vehicle autonomously travels without depending on driver's operation by controlling the driving force generation device, the steering mechanism, the braking device, or the like on the basis of information around the vehicle acquired by the vehicle outside information detection unit 12030 or the vehicle inside information detection unit 12040.

Furthermore, the microcomputer 12051 can output a control command to the body system control unit 12020 on the basis of information outside the vehicle acquired by the vehicle outside information detection unit 12030. For example, the microcomputer 12051 can perform cooperative control for the purpose of preventing glare, such as switching from a high beam to a low beam, by controlling the headlamp according to a position of a preceding vehicle or an oncoming vehicle detected by the vehicle outside information detection unit 12030.

The audio image output unit 12052 transmits at least one of an audio output signal and an image output signal to an output device capable of visually or audibly notifying a passenger of the vehicle or the outside of the vehicle of information. In the example of FIG. 12, an audio speaker 12061, a display unit 12062, and an instrument panel 12063 are illustrated as the output device. The display unit 12062 may include, for example, at least one of an on-board display and a head-up display.

Figure 13:
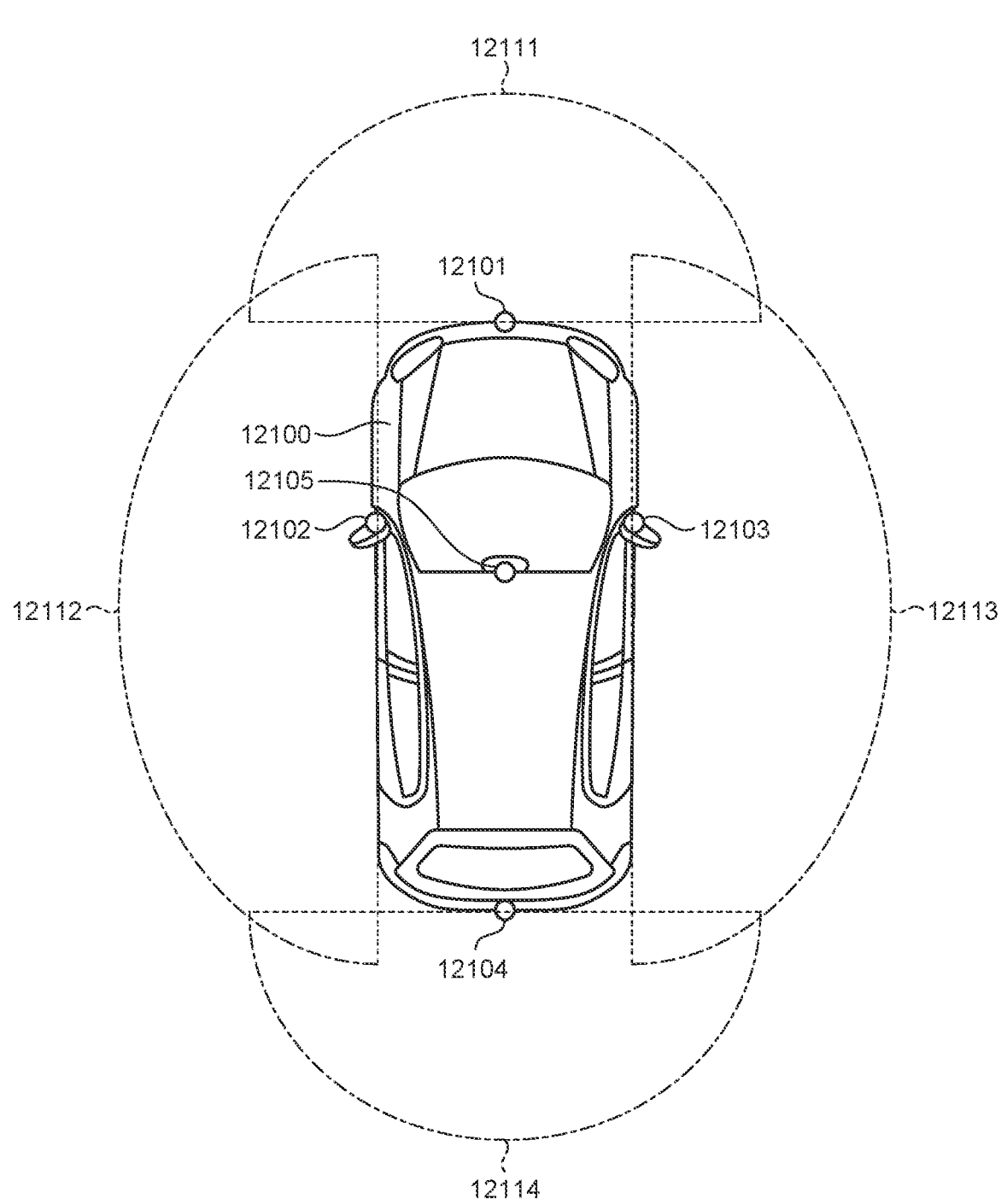
FIG. 13 is an explanatory view illustrating an example of installation positions of a vehicle outside information detection unit and imaging units.

FIG. 13 is a diagram illustrating an example of an installation position of the imaging unit 12031.

In FIG. 13, imaging units 12101, 12102, 12103, 12104, and 12105 are provided as the imaging unit 12031.

The imaging units 12101, 12102, 12103, 12104, and 12105 are provided, for example, at positions such as a front nose, a side mirror, a rear bumper, a back door, and an upper portion of an inner side of a windshield of the vehicle 12100. The imaging unit 12101 provided at the front nose and the imaging unit 12105 provided at the upper portion of the windshield in vehicle mainly acquire images in front of the vehicle 12100. The imaging units 12102 and 12103 provided on the side mirrors mainly acquire images of the sides of the vehicle 12100. The imaging unit 12104 provided on the rear bumper or the back door mainly acquires an image behind the vehicle 12100. The imaging unit 12105 provided at the upper portion of the windshield in the vehicle is mainly used to detect a preceding vehicle, a pedestrian, an obstacle, a traffic light, a traffic sign, a lane, or the like.

Note that an example of imaging ranges of the imaging units 12101 to 12104 is illustrated in FIG. 13. An imaging range 12111 is an imaging range of the imaging unit 12101 provided at the front nose, imaging ranges 12112 and 12113 are imaging ranges of the imaging units 12102 and 12103 provided on the side mirrors, respectively, and an imaging range 12114 is an imaging range of the imaging unit 12104 provided on the rear bumper or the back door. For example, an overhead view image of the vehicle 12100 viewed from above is obtained by superimposing image data taken by the imaging units 12101 to 12104.

At least one of the imaging units 12101 to 12104 may have a function of acquiring distance information. For example, at least one of the imaging units 12101 to 12104 may be a stereo camera including a plurality of imaging elements or may be an imaging element having pixels for phase difference detection.

For example, the microcomputer 12051 can extract, as a preceding vehicle, a three-dimensional object traveling at a predetermined speed (for example, 0 km/h or more) in substantially the same direction as the vehicle 12100, in particular, a closest three-dimensional object on a traveling path of the vehicle 12100 by obtaining a distance to each three-dimensional object within the imaging ranges 12111 to 12114 and a temporal change of the distance (a relative speed relative to the vehicle 12100) on the basis of the distance information obtained from the imaging units 12101 to 12104. Furthermore, the microcomputer 12051 can perform automatic brake control (including following stop control), automatic acceleration control (including following start-up control), and the like by setting an inter-vehicle distance to be secured in front of a preceding vehicle in advance. In this way, it is possible to perform cooperative control for the purpose of automatic driving or the like in which the vehicle autonomously travels without depending on driver's operation.

For example, the microcomputer 12051 can classify three-dimensional object data of three-dimensional objects into two-wheeled vehicles, standard-sized vehicles, large-sized vehicles, pedestrians, and other three-dimensional objects such as utility poles on the basis of the distance information obtained from the imaging units 12101 to 12104 and extract the three-dimensional object data for automatic obstacle avoidance. For example, the microcomputer 12051 distinguishes obstacles around the vehicle 12100 into obstacles that can be visually recognized by the driver of the vehicle 12100 and obstacles that are difficult to visually recognize. Then, the microcomputer 12051 determines a collision risk indicating a risk of collision with each obstacle, and in a case where the collision risk is equal to or larger than a set value and there is a possibility of collision, the microcomputer can perform driving assistance for collision avoidance by outputting an alarm to the driver through the audio speaker 12061 or the display unit 12062 or performing forced deceleration or avoidance steering through the drive system control unit 12010.

At least one of the imaging units 12101 to 12104 may be an infrared camera that detects infrared rays. For example, the microcomputer 12051 can recognize a pedestrian by determining whether or not a pedestrian is present in images taken by the imaging units 12101 to 12104. Such pedestrian recognition is, for example, performed by a procedure of extracting feature points in images taken by the imaging units 12101 to 12104 as infrared cameras and a procedure of performing pattern matching processing on a series of feature points indicating an outline of an object to determine whether or not the object is a pedestrian. In a case where the microcomputer 12051 determines that a pedestrian is present in the images taken by the imaging units 12101 to 12104 and recognizes the pedestrian, the audio image output unit 12052 controls the display unit 12062 to superimpose a rectangular contour line for emphasis on the recognized pedestrian. Furthermore, the audio image output unit 12052 may control the display unit 12062 to display an icon or the like indicating a pedestrian at a desired position.

An example of the vehicle control system to which the technique according to the present disclosure can be applied has been described above. The technique according to the present disclosure can be applied to the imaging unit 12031 in the configuration described above. Specifically, the distance measurement device 1 in FIG. 1 can be applied to the imaging unit 12031. By applying the technique according to the present disclosure to the imaging unit 12031, interference caused by a distance measurement device or the like of another vehicle can be suppressed.

Although the embodiment of the present disclosure has been described above, the technical scope of the present disclosure is not limited to the above embodiment, and various changes can be made without departing from the gist of the present disclosure. Furthermore, constituent elements in different embodiments and modifications may be appropriately combined.

For example, although an example in which the selection unit 8 and the distance calculation unit 9 are provided inside the distance measurement device 1 has been described in the embodiment, the selection unit 8 and the distance calculation unit 9 may be provided in an application processor provided outside the distance measurement device.

As a result, even when there is a problem in algorithm of the selection unit 8 or the distance calculation unit 9, the application processor can be improved by software update, so that such a problem can be easily improved.

Furthermore, the effects described in the present specification are merely examples and are not restrictive, and other effects may be produced.

The present technique can also have the following configurations.

(1)

A distance measurement device comprising:

a time measurement unit that measures time information indicating a time from a light emission timing at which a light source emits light to a light reception timing at which a light receiving element receives light;

a histogram generation unit that generates a histogram based on the time information;

a light source control unit that dynamically changes a driving state of the light source;

a selection unit that selects one peak based on the driving state of the light source in a case where a plurality of peaks are detected in the histogram in one frame; and a distance calculation unit that calculates a distance to an object based on the selected peak.

(2)

The distance measurement device according to (1), wherein the light source control unit randomly changes the driving state of the light source.

(3)

The distance measurement device according to (1) or (2), wherein the light source control unit changes the driving state of the light source by changing at least one of a pulse width, a rise time, and a fall time of a current for driving the light source.

(4)

The distance measurement device according to any one of (1) to (3), wherein the selection unit selects one peak based on at least one summary statistic selected from a group consisting of dispersion, skewness, kurtosis, asymmetry, and tailing degrees of the plurality of peaks.

(5)

The distance measurement device according to (4), wherein the selection unit selects one peak based on learning model generated by using information regarding the dynamically changed driving state of the light source and information regarding the summary statistic of the peaks in the histogram.

(6)

The distance measurement device according to any one of (1) to (5), wherein the selection unit is disabled in a case where a plurality of peaks are not detected in the histogram in one frame.

(7)

A distance measurement method comprising:

a time measurement step of measuring time information indicating a time from a light emission timing at which a light source emits light to a light reception timing at which a light receiving element receives light;

a histogram generation step of generating a histogram based on the time information;

a light source control step of dynamically changing a driving state of the light source;

a selection step of selecting one peak based on the driving state of the light source in a case where a plurality of peaks are detected in the histogram in one frame; and a distance calculation step of calculating a distance to an object based on the selected peak.

(8)

The distance measurement method according to (7), wherein in the light source control step, a driving state of the light source is randomly changed.

(9)

The distance measurement method according to (7) or (8), wherein in the light source control step, a driving state of the light source is changed by changing at least one of a pulse width, a rise time, and a fall time of a current for driving the light source.

(10)

The distance measurement method according to any one of (7) to (9), wherein in the selection step, one peak is selected based on at least one summary statistic selected from a group consisting of variance, skewness, kurtosis, asymmetry, and tailing degrees of the plurality of peaks.

(11)

The distance measurement method according to (10), wherein in the selection step, one peak is selected based on a learning model generated by using information regarding the dynamically changed driving state of the light source and information regarding the summary statistic of the peaks in the histogram.

(12)

The distance measurement method according to any one of (7) to (11), wherein in a case where a plurality of peaks are not detected in the histogram in one frame, the selection step is not performed.

REFERENCE SIGNS LIST

1 DISTANCE MEASUREMENT DEVICE
2 LIGHT SOURCE
3 LIGHT RECEIVING ELEMENT
4 LIGHT SOURCE DRIVING UNIT
5 LIGHT SOURCE CONTROL UNIT
6 TDC (EXAMPLE OF TIME MEASUREMENT UNIT)
7 HISTOGRAM GENERATION UNIT
8 SELECTION UNIT
9 DISTANCE CALCULATION UNIT

The invention claimed is:

1. A distance measurement device, comprising:

a time measurement unit configured to determine time information indicating a time from a light emission timing to a light reception timing, wherein a light source emits light at the light emission timing, and a light receiving element receives reflected light at the light reception timing;

a histogram generation unit configured to generate a histogram based on the time information;

a light source control unit configured to dynamically change driving state of the light source;

a selection unit configured to:

detect a plurality of peaks in a frame of a plurality of frames in the histogram;

generate a learning model based on information associated with the dynamically changed driving state of the light source and information associated with a summary statistic of each peak of the plurality of peaks in the frame, wherein the summary statistic includes at least one of a dispersion of the each peak of the plurality of peaks, a skewness of the each peak of the plurality of peaks, a kurtosis of the each peak of the plurality of peaks, an asymmetry of the each peak of the plurality of peaks, or a tailing degree of the each peak of the plurality of peaks; and select a peak among the plurality of peaks based on the generated learning model; and a distance calculation unit configured to calculate a distance to an object based on the selected peak.

2. The distance measurement device according to claim 1, wherein the light source control unit is further configured to randomly change the driving state of the light source.

3. The distance measurement device according to claim 1, wherein the light source control unit is further configured to:

change at least one of a pulse width of a driving current of the light source, a rise time of the driving current, or a fall time of the driving current; and change the driving state of the light source based on the at least one of the changed pulse width, the changed rise time, or the changed fall time.

4. A distance measurement method, comprising:

determining time information indicating a time from a light emission timing to a light reception timing, wherein a light source emits light at the light emission timing, and a light receiving element receives reflected light at the light reception timing;

generating a histogram based on the time information;

dynamically changing a driving state of the light source;

detecting a plurality of peaks in a frame of a plurality of frames in the histogram;

generating a learning model based on information associated with the dynamically changed driving state of the light source and information associated with a summary statistic of each peak of the plurality of peaks in the frame, wherein the summary statistic includes at least one of a dispersion of the each peak of the plurality of peaks, a skewness of the each peak of the plurality of peaks, a kurtosis of the each peak of the plurality of peaks, an asymmetry of the each peak of the plurality of peaks, or a tailing degree of the each peak of the plurality of peaks;

selecting a peak among the plurality of peaks based on the generated learning model; and calculating a distance to an object based on the selected peak.

* * * * *